United States Patent [19]
Shih et al.

[11] Patent Number: 5,011,895
[45] Date of Patent: Apr. 30, 1991

[54] PRECIPITATION POLYMERIZATION OF COPOLYMERS OF A VINYL LACTAM AND A POLYMERIZABLE CARBOXYLIC ACID USING SUB-SURFACE FEEDING

[75] Inventors: Jenn S. Shih, Paramus; Terry E. Smith, Morristown; John Zamora, Paramus; Minas Economidis, Passaic, all of N.J.

[73] Assignee: GAF Chemicals Corporation, Wayne, N.J.

[21] Appl. No.: 532,843

[22] Filed: Jun. 4, 1990

[51] Int. Cl.$^5$ .......................... C08F 2/00; C08F 26/00
[52] U.S. Cl. ...................................... 526/88; 526/264
[58] Field of Search ................................... 526/264, 88

[56] References Cited
PUBLICATIONS

T. Endo et al. (1971), *Makromol Chem.* 148, 205–210.
H. Uelzmann (1958), *J. Polym. Sci.* 33, 377–379.

*Primary Examiner*—Joseph L. Schofer
*Assistant Examiner*—M. Nagumo
*Attorney, Agent, or Firm*—Walter Katz; Marilyn J. Maue; Joshua J. Ward

[57] ABSTRACT

What is described herein is an improved precipitation polymerization process and copolymer products produced thereby. The process herein is carried out by charging a reactor with a solvent in which the copolymer product is substantially insoluble over the entire compositional range of the copolymer, preferably heptane or cyclohexane, and a polymerization initiator, heating to 50° to 150° C., agitating, and then simultaneously feeding selected amounts of a vinyl lactam and a polymerizable carboxylic acid into said reactor below the surface of the solvent while continuing to agitate the mixture to precipitate the copolymer from solution as a fine, white powder, and recovering the copolymer of defined composition.

10 Claims, No Drawings

PRECIPITATION POLYMERIZATION OF COPOLYMERS OF A VINYL LACTAM AND A POLYMERIZABLE CARBOXYLIC ACID USING SUB-SURFACE FEEDING

BACKGROUND OF THE INVENTION

1. Field of the Invention

This invention relates to precipitation polymerization of copolymers of a vinyl lactam and a polymerizable carboxylic acid, and, preferably to a process of making such copolymers having a wide compositional range, prepared in high yield, as a white powder, with effective control of the exothermic reaction, and without excessive thickening of the reaction product during the polymerization, and under reaction conditions which can provide a copolymer product over a wide range of molecular weights having low residual monomers, and which can be recovered easily to provide copolymer powders having advantageous physical properties.

2. Description of the Prior Art

Copolymers of vinyl lactams, e.g. vinyl pyrrolidone (VP) or vinyl caprolactam (VCL), and polymerizable carboxylic acids, e.g. acrylic acid (AA) or methacrylic acid (MAA), have found application in the photographic industry, as coatings, as biological membranes, in drug release systems, as preservatives, in oil recovery processes, in immunochemicals, and in cosmetic materials.

Solution polymerization and precipitation polymerization are two available methods for making these copolymers; see in U.S. Pat. Nos. 3,044,873; 3,862,915; and 4,283,384; and articles by Endo et al., in J. Makromol. Chem. 148, 205 (1971); and by Uelzmann, in J. Polymer Sci. 33, 377 (1958).

The solution polymerization process is used when both reactant monomers and the copolymer product are soluble in a reaction solvent. However, this method suffers from the following disadvantages:

(1) Desirable compositions of the copolymer may not be soluble in a selected solvent; (2) the yields of such copolymer may be low; (3) the copolymer may be colored; (4) the solvent may be a high boiling liquid which is difficult to separate from the copolymer; and (5) the solvent may be a protic liquid, e.g. water or mixtures thereof, which causes considerable hydrolysis of the vinyl lactam under acidic reaction conditions.

The precipitation polymerization method is useful when the monomers are soluble in the reaction solvent and the copolymers are insoluble in the solvent. Benzene, tetrahydrofuran, acetone and methyl ethyl ketone are known precipitation polymerization solvents. Unfortunately, these solvents have one or more of the following disadvantages:

(1) Useful copolymer compositions may not be insoluble in a selected reaction solvent, which restricts the process to a narrow copolymer compositional range; (2) the copolymer may precipitate only as a gelatinous mass which is difficult to filter; (3) low yields of polymer may be obtained; and (4) the solvent may be toxic.

Furthermore, during the precipitation polymerization process, (1) the reaction product may become too viscous to enable continued agitation; (2) the reaction exotherm may be quite difficult to control; and (3) a high solids content product may not be easy to obtain.

For these and other reasons, present solution polymerization and precipitation polymerization processes for making copolymers of a vinyl lactam and an acrylic acid have not been very successful on a commercial scale.

Accordingly, it is an object of this invention to provide an improved precipitation polymerization method of making copolymers of a vinyl lactam and a polymerizable carboxylic acid.

Other objects of the invention include one or more of the following:

(a) to provide an improved precipitation process under reaction conditions which avoids excessive thickening of the reaction product during the polymerization;

(b) to provide for effective control of the exotherm of the reaction;

(c) to form the copolymer product at a high solids content during the polymerization;

(d) to precipitate the copolymer in high yield as a fine, white powder;

(e) which powder is insoluble in the reaction solvent over the entire compositional range of the copolymer;

(f) which precipitate can be filtered and dried easily;

(g) to provide copolymers of all compositional ranges; and (h) which copolymers are characterized by having a predetermined average molecular weight, low hygroscopicity, a high glass transition temperature, exhibiting polyelectrolyte behavior, and being soluble in an aqueous basic solution of pH 8 and insoluble in an aqueous acid solution of pH 3.

These and other objects and features of the invention will be made apparent from the following description of the invention.

SUMMARY OF THE INVENTION

What is described herein is an improved precipitation polymerization process and copolymer products produced thereby. The process herein is carried out by charging a reactor with a solvent in which the copolymer product is substantially insoluble over the entire compositional range of the copolymer, preferably heptane or cyclohexane, and a polymerization initiator, heating to 50° to 150° C., agitating, and then simultaneously feeding selected amounts of a vinyl lactam and a polymerizable carboxylic acid into said reactor below the surface of the solvent while continuing to agitate the mixture to precipitate the copolymer from solution as a fine, white powder, and recovering the desired copolymers of defined composition.

DETAILED DESCRIPTION OF THE INVENTION

In accordance with the invention, copolymers of a vinyl lactam and a polymerizable carboxylic acid are made by a precipitation polymerization process in which the monomers are fed into the reactor simultaneously below the surface of a precharged solution of polymerization initiator in a suitable solvent.

Suitable vinyl lactams for use herein include vinyl pyrrolidone, vinyl caprolactam, and alkylated derivatives thereof. Suitable polymerizable carboxylic acids include e.g. acrylic acid and methacrylic acid. Acrylic acid itself, or methacrylic acid, is a preferred coreactant monomer in the polymerization. These monomers may be employed in weight ratios over the entire compositional range of the COpolymers, i.e. from 1–99 weight percent vinyl lactam and 99:1 weight percent of acrylic acid. Accordingly, weight ratios of VP:AA in the copolymer of 99:1, 75:25, 50:50, 25:75 and 1:99, for example, may be conveniently prepared in this invention in substantially quantitative yields.

The reaction solvent in the process suitably is one in which the copolymer is insoluble over the entire compositional range of copolymers. Preferably, the solvent is a $C_3$–$C_{10}$ saturated hydrocarbon which is branched or unbranched, cyclic or acyclic, such as $C_5$–$C_8$ aliphatic hydrocarbons, or mixtures thereof.

Most preferably, the solvent is selected from heptane and cyclohexane, which provides high yields of a precipitate of the desired copolymer composition as a fine, white powder which is easy to filter and dry.

The amount of solvent used in the process of the invention should be sufficient to dissolve an appreciable amount of the reactants and to maintain the copolymer precipitate in a stirrable state at the end of the polymerization. In the sub-surface feeding technique of the invention, up to about 40% solids can be attained in the reaction mixture while controlling the exothermic heating of the reaction solution.

The precipitation polymerization process of the invention is carried out in the presence of a polymerization initiator, preferably a free radical initiator, and most suitably, a peroxy ester, e.g. t-butylperoxy pivalate, although other free radical initiators such as acyl-peroxides, alkyl peroxides and azo-nitriles, known in the art or described in the aforementioned references, may be used as well.

The amount of such initiator may vary widely in order to make different MW copolymers; generally about 0.2–10.0% is used, based on the weight of total monomers charged.

The reaction temperature may vary widely; generally the reactants are maintained at about 50°–150° C., preferably 60°–85° C., during the polymerization. Pressure usually is kept at atmospheric pressure, although higher and lower pressures may be used as well.

The reaction mixture should be stirred vigorously under an inert atmosphere, e.g. nitrogen, during the polymerization. A stirring rate of about 100–600 rpm in a 2-liter lab reactor is quite adequate to effect the desired polymerization and to keep the precipitate in a stirrable state during the polymerization.

The monomers and initiator used herein are commercially available materials, as described below.

| Monomers | Source | Form |
|---|---|---|
| Vinyl pyrrolidone or | GA | Liquid |
| Vinyl caprolactam | Aldrich | Solid |
| Acrylic acid or | Rohm and Haas | Liquid |
| Methacrylic acid | Aldrich | Liquid |
| Initiator | | |
| t-Butylperoxy pivalate | Pennwalt Corp. (Lupersol 11) | Liquid; 75% solution in mineral spirits |

The precipitation polymerization process of the invention is carried out by first precharging a suitable reactor with a predetermined amount of the solvent, and heating the solution to a desired reaction temperature while stirring vigorously under an inert gas atmosphere. The initiator is then charged into the reactor. Then selected amounts of the vinyl lactam and polymerizable carboxylic acid monomers are admitted into the reactor below the surface of the solution over a period of time, generally about 3 hours or more. The monomers may be added as separate streams, or as a mixture of both monomers. Then the reaction mixture is held for an additional period of time at a higher temperature for polymerization to be completed. Finally, the mixture is cooled to room temperature. Filtering, washing with solvent, and drying provides the copolymer in yields approaching quantitative, and, substantially, in a composition predetermined by the weight ratio of monomers introduced into the reactor. Alternatively, the solvent can be removed from the reaction product to provide the copolymer.

The copolymers of the invention are generally characterized by their having predetermined average molecular weights, low hygroscopicity, high glass transition temperatures, and exhibiting polyelectrolyte behavior in water, as described below.

a. Molecular Weight

The weight average molecular weight for a 75:25 wt. ratio VP:AA copolymer, for example, having a Fikentscher K-value of about 70, was about 180,000, as determined by light scattering.

b. Hygroscopicity

The hygroscopicity of the copolymers is lower than the weighted average of the homopolymers. This effect is maximized for copolymers, for example, having a VP:AA mole ratio of about 1:1, where the hygroscopicity may be actually lower than the value of either homopolymer. Hygroscopicity is measured by the equilibrium moisture pickup of the copolymer powders at 50% relative humidity.

c. Glass Transition Temperature, Tg

This property shows the effect of strong hydrogen bonding in the copolymer which causes a strong positive deviation from typical behavior, which is most prominent at a vinyl lactam:acrylic or methacrylic acid mole ratio of about 1:1.

d. Solubility

The copolymer exhibits very unusual solubility characteristics: it is insoluble in aqueous acid solution of pH 3 but soluble in basic solution of pH 8. Table I below illustrates the solubility characteristics of copolymers of different compositions in several aqueous and organic solvents.

TABLE I

| P(VP/AA) SOLUBILITY | | | | | | |
|---|---|---|---|---|---|---|
| VP/AA W/W | 95/5 | 85/15 | 75/25 | 50/50 | 25/75 | 10/90 |
| VP/AA M/M | 92/8 | 79/21 | 66/34 | 39/61 | 18/82 | 7/93 |
| WATER | S | I | I | I | I | I |
| 0.1N NaOH | S | S | S | S | S | S |
| ETHANOL | PS | I | I | I | I | I |
| DMF | S | S | S | S | S | S |
| NMP | S | S | S | S | S | S |
| ACETONE | I | I | I | I | I | I |
| CHLOROFORM | PS | I | I | I | I | I |
| TOLUENE | I | I | I | I | I | I |

TABLE I-continued

| P(VP/AA) SOLUBILITY | | | | | |
|---|---|---|---|---|---|
| HEPTANE | I | I | I | I | I | I |

SYMBOLS
P = Polymer
VP = Vinyl Pyrrolidone
AA = Acrylic Acid
DMF = Dimethylformamide
NMP = N-methylpyrrolidone
W/W = Weight to weight
M/M = Mole to mole
S = Soluble
I = Insoluble
PS = Partly soluble e. Viscosity

The viscosity in water is pH dependent in the pH range of about 4–12. The maximum viscosity occurs at a pH of about 8–9. Dilute aqueous solutions exhibit polyelectrolyte behavior.

The invention will be illustrated hereinafter by the following working examples.

EXAMPLES 1-5

Preparation of Copolymers of Vinyl Pyrrolidone (VP) and Acrylic Acid (AA)

A 2-liter, 4-necked reaction kettle was equipped with a condenser, a constant speed mechanical stirrer set at 170 rpm with a torque indicator, and an anchor agitator having an open radius of 4 and 5/6 inches, positioned in the middle of the reactor, and extended to within 2 inches of the bottom of the reactor. Two dip tubes were connected to two metering pumps. A nitrogen purge adaptor and a thermocouple connected to a temperature controller also were provided in the kettle apparatus. The thus-equipped reactor then was charged with 1000 g. of heptane solvent which filled the reactor to about 4 inches above the bottom of the dip tubes. The reactor then was heated to 65° C. during 30 minutes while stirring under nitrogen gas, and held at 65° C. for an additional 30 minutes. Then 520 microliters (0.6 g.) of t-butylperoxy pivalate was added. Then simultaneously separate feed streams of vinyl pyrrolidone and acrylic acid were admitted into the reactor through the dip tubes to a position below the surface of the heptane, and over determined periods of time as set forth below in Table I. After completion of feeding of both monomers, the reactor was heated to 85° C. during ½ hour and held there for another ½ hour. Then an additional 200 microliters of t-butylperoxy pivalate was charged hourly for 4 hours at 85° C.

The reaction product then was cooled to room temperature during a period of about 2 hours. A fine, white powder precipitate of copolymer product was obtained which was filtered, washed twice with heptane and dried for 16 hours at 100° C. and again for 16 hours in a vacuum oven at 90° C.

A 75:25 VP:AA copolymer (wt. ratio) was obtained in 97% yield.

The results are shown in Table II below for different amounts of monomers and feeding times at constant feeding rates.

TABLE II

Summary and Results of Examples 1-5

| Ex. No. | VP (g) | AA (g) | Feeding Period (hrs) | Copolymer % Solids |
|---|---|---|---|---|
| 1 | 150 | 50 | 1 | 16.7 |
| 2 | 150 | 50 | 2 | 16.7 |
| 3 | 150 | 50 | 3 | 16.7 |
| 4 | 300 | 100 | 6 | 29.0 |
| 5 | 450 | 150 | 9 | 37.5 |

Table III below characterizes the copolymer products made by the process of Example 1.

TABLE II

Characterization of Copolymer Product

| | Composition (% by Wt.) | | Residual Monomers (% by Wt.) | | | |
|---|---|---|---|---|---|---|
| Ex. No. | VP | AA | VP | AA | K-Value | Color |
| 2 | 70.6 | 23.7 | — | — | 77.1 | White |
| 3 | 74.1 | 23.2 | 0.14 | 0.2 | 71.3 | White |
| 4 | 72.8 | 23.6 | 0.19 | 0.2 | 67.9 | White |
| 5 | 74.3 | 24.1 | 0.13 | 0.2 | 73.3 | White |

COMPARATIVE EXAMPLE

The process of Example 1 was repeated by feeding the monomers onto the surface of the solvent. The reaction mixture became quite viscous immediately after the additions and continued stirring was impossible. A film of copolymer was observed on the surface of the solvent at this time.

EXAMPLE 6-7

The procedure of Example 1 was followed to provide copolymers having VP:AA weight ratios of 50:50 and 25:75.

What is claimed is:

1. A precipitation polymerization process for making fine, white, powdered copolymers of vinyl pyrrolidone and acrylic acid which comprises:
   (a) charging a reactor with a solvent in which the copolymer product is substantially insoluble over the entire compositional range of the copolymers, and a polymerization initiator, which is heated to 50° to 150° C., and agitated; and
   (b) simultaneously feeding said vinyl pyrrolidone and acrylic acid monomers in the weight ratio of about 3:1 to 10:1, respectively, into said reactor below the surface of the solvent over a period of about 1 to 9 hours while continuing to agitate the reaction mixture to control the exothermic heating of the reaction solution and to precipitate the copolymer as a fine, white powder from solution to produce a reaction product having up to about 40% solids.

2. A process according to claim 1 including the steps of (c) filtering the reaction product, and (d) drying the precipitate to obtain the copolymer product.

3. A process according to claim 1 wherein said solvent is a $C_3$-$C_{10}$ saturated hydrocarbon, branched or unbranched, cyclic or acylic.

4. A process according to claim 1 wherein said solvent is a $C_5$-$C_8$ aliphatic hydrocarbon, or mixtures thereof.

5. A process according to claim 1 wherein said solvent is heptane or cyclohexane.

6. A process according to claim 1 including the steps of recovering the reaction product from the reactor and drying.

7. A process according to claim 1 wherein in step (a) the temperature is 60° to 85° C.

8. A process according to claim 1 which includes the step of removing the solvent from the reaction product in the kettle thereby to provide the copolymer product as a powder.

9. A process according to claim 1 wherein the monomers are added as separate streams of each monomer, or as a mixture of both monomers.

10. A process according to claim 1 in which said ratio is about 3:1, the residual vinyl pyrrolidone monomer content is about 0.19% by wt., or less, the residual acrylic acid monomer content is about 0.2, or less, the K-value of the copolymer product is about 65-77, and the yield is about 97%.

* * * * *